(12) United States Patent
Lauer

(10) Patent No.: US 12,113,425 B2
(45) Date of Patent: Oct. 8, 2024

(54) ELECTRIC MOTOR

(71) Applicant: Schaeffler Technologies AG & Co. KG, Herzogenaurach (DE)

(72) Inventor: Sandro Lauer, Baiersdorf (DE)

(73) Assignee: Schaeffler Technologies AG &Co.KG, Herzogenaurach (DE)

( * ) Notice: Subject to any disclaimer, the term of this patent is extended or adjusted under 35 U.S.C. 154(b) by 360 days.

(21) Appl. No.: 17/631,154

(22) PCT Filed: Jul. 24, 2020

(86) PCT No.: PCT/DE2020/100661
§ 371 (c)(1),
(2) Date: Jan. 28, 2022

(87) PCT Pub. No.: WO2021/023340
PCT Pub. Date: Feb. 11, 2021

(65) Prior Publication Data
US 2022/0271612 A1 Aug. 25, 2022

(30) Foreign Application Priority Data
Aug. 2, 2019 (DE) .................. 10 2019 120 913.7

(51) Int. Cl.
| | |
|---|---|
| *H02K 5/22* | (2006.01) |
| *H02K 5/173* | (2006.01) |
| *H02K 5/20* | (2006.01) |
| *H02K 11/33* | (2016.01) |

(52) U.S. Cl.
CPC ............. *H02K 5/225* (2013.01); *H02K 5/173* (2013.01); *H02K 5/20* (2013.01); *H02K 11/33* (2016.01); *H02K 2211/03* (2013.01)

(58) Field of Classification Search
CPC .......... H02K 5/225; H02K 5/173; H02K 5/20; H02K 11/33; H02K 2211/03; H02K 2203/03
See application file for complete search history.

(56) References Cited

U.S. PATENT DOCUMENTS

| | | | |
|---|---|---|---|
| 6,317,332 B1* | 11/2001 | Weber | .......... E05F 15/697 310/71 |
| 8,220,426 B2 | 7/2012 | Uehama et al. | |
| 9,423,280 B2* | 8/2016 | Schwendimann | ... G01D 11/245 |
| 9,768,658 B2 | 9/2017 | Bulatow | |
| 11,411,457 B2* | 8/2022 | Schuler | ........... H02K 5/15 |
| 2005/0183695 A1 | 8/2005 | Keefover et al. | |
| 2011/0278995 A1 | 11/2011 | Akutsu | |
| 2015/0340923 A1 | 11/2015 | Lee et al. | |
| 2016/0079828 A1 | 3/2016 | Schuler et al. | |

(Continued)

FOREIGN PATENT DOCUMENTS

| | | |
|---|---|---|
| CN | 104704725 A | 6/2015 |
| CN | 105932830 A | 9/2016 |

(Continued)

*Primary Examiner* — Robert W Horn

(57) ABSTRACT

The disclosure relates to an electric motor having a base motor module and an electronic module. The electronic module is electrically and mechanically connected to the base motor module and comprises a printed circuit board and an electronics housing. The electronics housing forms two supporting surfaces, with which the printed circuit board can be brought into contact.

20 Claims, 5 Drawing Sheets

(56) References Cited

U.S. PATENT DOCUMENTS

| | | |
|---|---|---|
| 2016/0172918 A1 | 6/2016 | Hirotani et al. |
| 2016/0211727 A1 | 7/2016 | Maier |
| 2016/0254732 A1 | 9/2016 | Kojima et al. |
| 2016/0359434 A1 | 12/2016 | Numata |
| 2018/0062478 A1 | 3/2018 | Kamogi et al. |
| 2019/0074734 A1 | 3/2019 | Tanaka et al. |
| 2019/0376421 A1 | 12/2019 | Hoppe et al. |
| 2020/0169144 A1 | 5/2020 | Schuler et al. |
| 2021/0242753 A1* | 8/2021 | Lauer ............... H02K 11/33 |
| 2022/0271612 A1* | 8/2022 | Lauer ............... H02K 5/225 |

FOREIGN PATENT DOCUMENTS

| | | |
|---|---|---|
| DE | 102010009498 A1 | 9/2011 |
| DE | 102010026985 A1 | 11/2011 |
| DE | 202010007406 U1 | 11/2011 |
| DE | 102013215949 A1 | 3/2014 |
| DE | 102013212933 B3 | 11/2014 |
| DE | 102015200866 A1 | 7/2016 |
| DE | 202016104568 U1 | 10/2016 |
| DE | 102015219149 A1 | 3/2017 |
| DE | 102016206957 A1 | 10/2017 |
| DE | 102016209617 A1 | 12/2017 |
| DE | 102017120040 A1 | 3/2018 |
| DE | 102017104981 A1 | 9/2018 |
| DE | 102017116249 A1 | 1/2019 |
| EP | 1523087 A1 | 4/2005 |
| EP | 1688605 A1 | 8/2006 |
| WO | 2019015720 A1 | 1/2019 |

\* cited by examiner

Assembly: Base Motor Module

Assembly: Plug Module

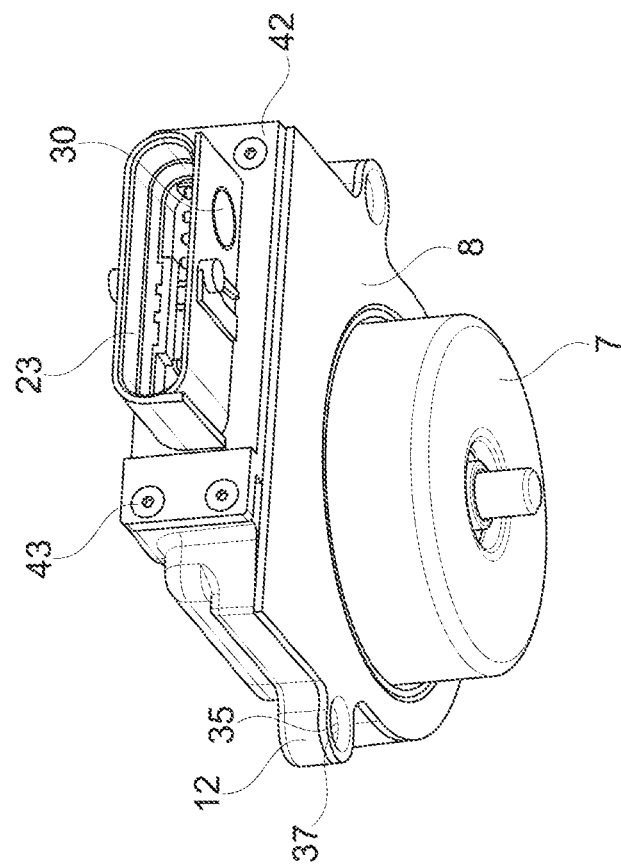
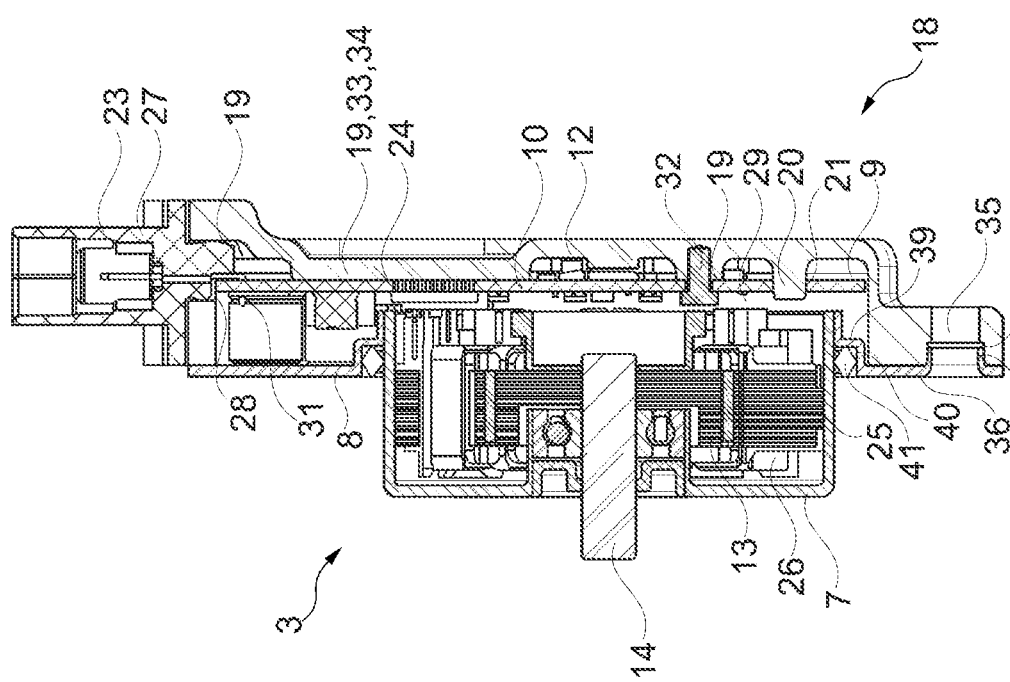

ELECTRIC MOTOR

CROSS-REFERENCE TO RELATED APPLICATIONS

This application is the U.S. National Phase of PCT Application No. PCT/DE2020/100661 filed on Jul. 24, 2020, which claims priority to DE 10 2019 120 913.7 filed on Aug. 2, 2019, the entire disclosures of which are incorporated by reference herein.

TECHNICAL FIELD

This disclosure relates to an electric motor suitable for use in an electric camshaft adjuster or in a mechanism for adjusting the piston stroke of an internal combustion engine.

BACKGROUND

An electric motor for an electric camshaft adjuster is known, for example, from DE10 2013 212 933 B3. This electric motor comprises a first, pot-shaped housing part made of metal and a second housing part made of plastic, which seals off the first housing part, wherein a first rolling bearing is arranged in the first housing part and a second rolling bearing is arranged in the second housing part. Here, the rolling bearing arranged in the first, pot-shaped housing part is designed as a fixed bearing. A shaft seal is located on the side of this rolling bearing facing the interior of the housing.

Another electric motor of an electric camshaft adjuster is disclosed in U.S. Pat. No. 8,220,426 B2. In this case too, a motor shaft of the electric motor is supported by means of two rolling bearings, namely ball bearings.

Electric motors for such an application are known for example from patent DE10 2013 212 933 B3 and U.S. Pat. No. 8,220,426 B2. In both publications, electric motors for camshaft adjustment are described, which are suitable for use on internal combustion engines of cars. Externally arranged control electronics systems are required in order to be able to implement the desired control functions. Such electric motors can therefore only be used in an internal combustion engine if additional control units matched to the electric motor are used with appropriate cabling. Alternatively, this function can be added to the motor control unit. In each of the two cases, the use of the electric motor is associated with additional effort.

US2016/359 434 A1, for example, goes one step further. An electric motor with an integrated driver bridge is described here, i.e., the power electronics are embedded in the electric motor. However, an additional external control unit is still required, which contains the heat-sensitive control electronics system, for example a microprocessor.

SUMMARY

The object of the disclosure is to further develop electric motors suitable for camshaft adjusters in such a way that the control electronics system and the electric motor form one unit.

According to the disclosure, this object is achieved by an electric motor having the features described herein.

Accordingly, the electric motor has a base motor module and an electronic module which is electrically and mechanically connected to the base motor module and which comprises a printed circuit board and an electronics housing. The electronics housing forms two supporting surfaces with which the printed circuit board can be brought into contact. Advantageously, the base motor module and the electronic module can be connected to one another. The base motor module comprises the electric motor coil, which must be connected to the printed circuit board. So-called press-fit contacts can be used for this connection: When pressed onto the press-fit contacts, the press-fit contacts can, according to the disclosure, be supported on supporting surfaces. The flow of force is directed through the electronics housing. In addition, it can be ensured that the printed circuit board can be positioned at a defined distance from the electric motor, in particular from the magnetic ring of the rotor.

The electronics housing forms a mandrel that reaches through an opening in the printed circuit board. The printed circuit board can advantageously be guided and positioned during assembly. The electronics housing preferably forms a fastening point which is surrounded by one of the supporting surfaces. In particular, when the press-fit contacts of the coil are pressed in, forces can be directed into the electronics housing via the supporting surface. The fastening point is used to fasten the circuit board, for example by means of a screw connection.

In a further development, the circuit board can be supported on one of the supporting surfaces indirectly via a plug. The plug can therefore be brought into contact with the supporting surface. During assembly, the circuit board is pressed against the plug, which directs forces into the electronics housing via the supporting surface. For example, press-fit contacts can be supported in a non-positive manner on a molding of the plug when the circuit board is pressed in against the electronics housing.

In an example embodiment, a heat-conducting paste is applied between at least one of the supporting surfaces and the printed circuit board. The heat-conducting paste facilitates the dissipation of heat via the housing, so that safe operation is possible even when the electric motor develops a large amount of heat. For this purpose, the at least one of the supporting surfaces is designed as an inwardly offset surface of the pot-shaped electronics housing. In this way, a relatively large surface area can be made available, in particular in comparison with one of the other supporting surfaces. The heat-conducting paste is applied between the electronics housing, made of aluminum, for example, and the printed circuit board.

In an example embodiment the electronic module comprises the power electronics system, the driver electronics system and the control electronics system, wherein the electronic module and the base motor module dissipate heat via one heat path each, wherein the heat paths are separated from one another. By separating the heat paths, the waste heat from the base motor module and electronic module can be conducted separately into a heat sink in the surroundings. The waste heat from the electric motor can, for example, be emitted to the motor block or another surrounding component. The temperature therefore corresponds to the oil temperature. The waste heat from the electronic module can be dissipated to the surroundings.

In an example embodiment, the base motor module dissipates heat via a heat path A, wherein the heat is conducted via a heat-conducting plate into a heat sink. The contact surface can be enlarged and the heat dissipation can be facilitated via the heat-conducting plate.

In an example embodiment, the heat-conducting plate consists of a flat surface and is suitable for being brought into contact with a component adjacent to the electric motor and forming the heat sink. The adjacent component can be a timing drive box cover.

In an example embodiment, the adjacent component has a flat mating surface. In this way, the thermal conductivity between the components can be optimized.

In an example embodiment, the heat-conducting plate is configured as part of a flange plate, which forms a press fit with the base motor and forms the base motor module. The base motor module thus comprises the base motor and the flange plate. The flange plate is suitable for attaching the base motor module to a surrounding component and for forming a heat conduction path between the base motor and the adjacent component.

In an example embodiment, the electronic module comprises an electronics housing and dissipates heat via a heat path B, wherein the heat path B runs via the electronics housing to the surroundings as a heat sink. The heat paths A and B can be separated in this way, which protects the electronic module from overheating.

A further separation of the heat paths can be achieved in that the two heat paths are separated from one another by an insulation space, wherein the insulation space is formed between the base motor module and the electronic module.

In an example embodiment, the base motor module comprises a housing pot, a stator and a rotor mounted in the housing pot by means of a rolling bearing and is inserted into the plug module. Electrical connections are made between the plug module and the base motor module through connections that can be produced by joining the modules together in their axial direction. In a further development, the plug module comprises a sensor circuit board interacting with the rotor. In a further development, the electrical connections between the plug module and the base motor module are formed as insulation displacement connections.

The object is further achieved by an electric motor arrangement for a variable valve train of an internal combustion engine, wherein the arrangement has two electric motors and wherein at least one of the two electric motors is designed according to any one of the preceding embodiments. The two electric motors are interconnected in master-slave operation. In this way, a fail-safe function can be implemented in that one electric motor also takes over the control of the other electric motor if one of the motor controls has failed. In addition, it is conceivable to equip only one of the electric motors with a control unit for cost reasons.

The object is further achieved by a construction kit, comprising modules of electric motors, in particular a uniform base motor module and various plug modules that can be combined with the base motor module and that differ from one another in terms of sensor systems (34) and control electronics systems, wherein the base motor module and each plug module form parts of insulation displacement connections, which can be completed by joining the various modules in the axial direction of the base motor module.

BRIEF DESCRIPTION OF THE DRAWINGS

In the following, an exemplary embodiment of the disclosure is explained in more detail by means of drawings. In the figures:

FIG. 5 shows a sectional illustration of an embodiment of the electric motor, and FIG. 6 shows a perspective view of the electric motor from FIG. 5.

DETAILED DESCRIPTION

Figure 1:
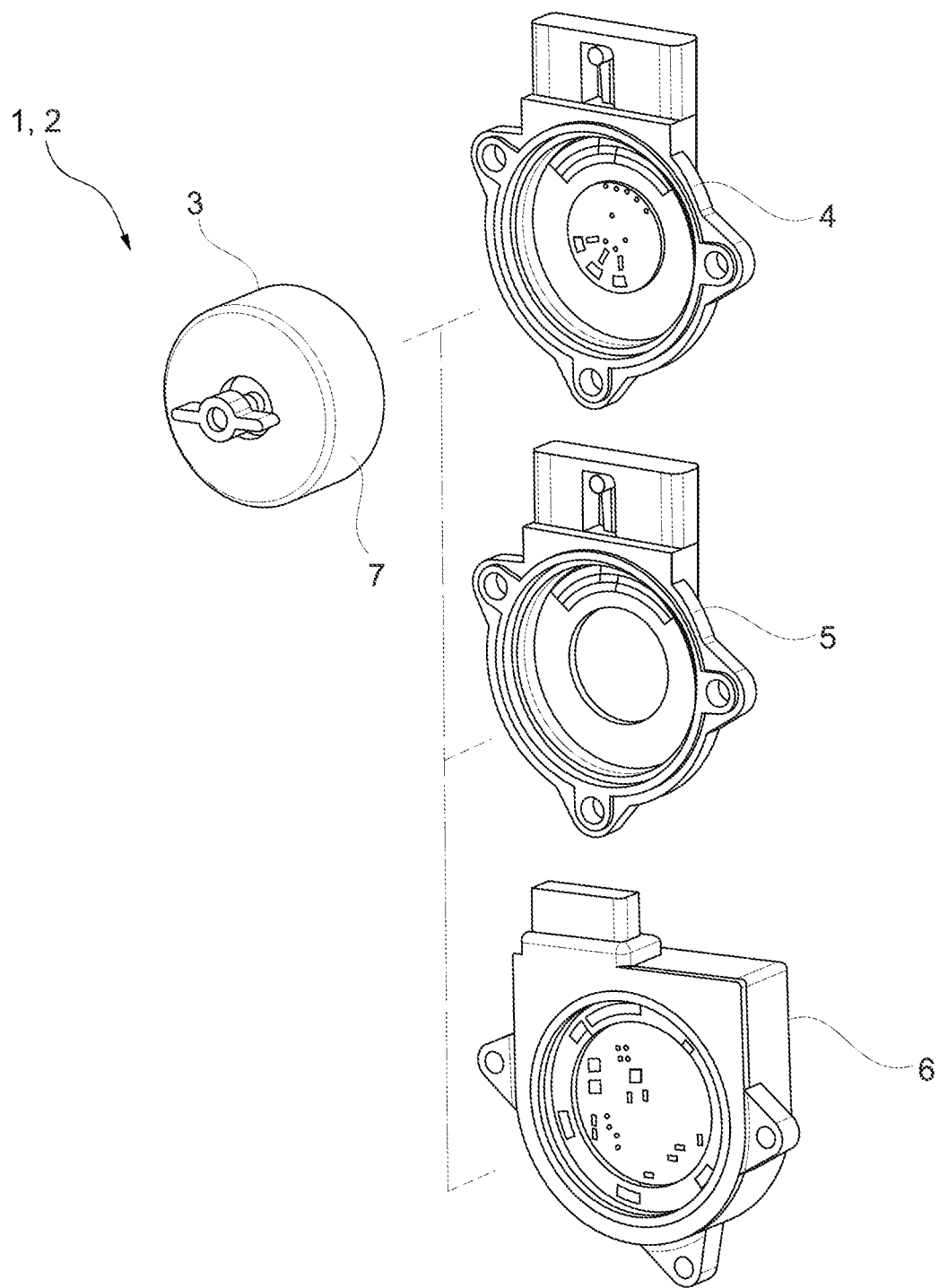
FIG. 1 shows a set for assembling electric motors, formed of a base motor module and various plug modules.

FIG. 1 shows a construction kit, generally designated by the reference numeral 1, which is suitable for constructing various electric motors 2. The electric motors 2 are used in electromechanical camshaft adjusters, as are known in principle from the prior art mentioned.

The construction kit 1 is composed of a base motor module 3 and various plug modules 4, 5, 6. All core functions of the electric motor 2 are implemented in the base motor module 3. The structure of the base motor module 3 and a complete electric motor 2 can be seen in FIG. 3. A housing 7 of the base motor module 3 is configured as a housing pot made of sheet metal.

Figure 2:
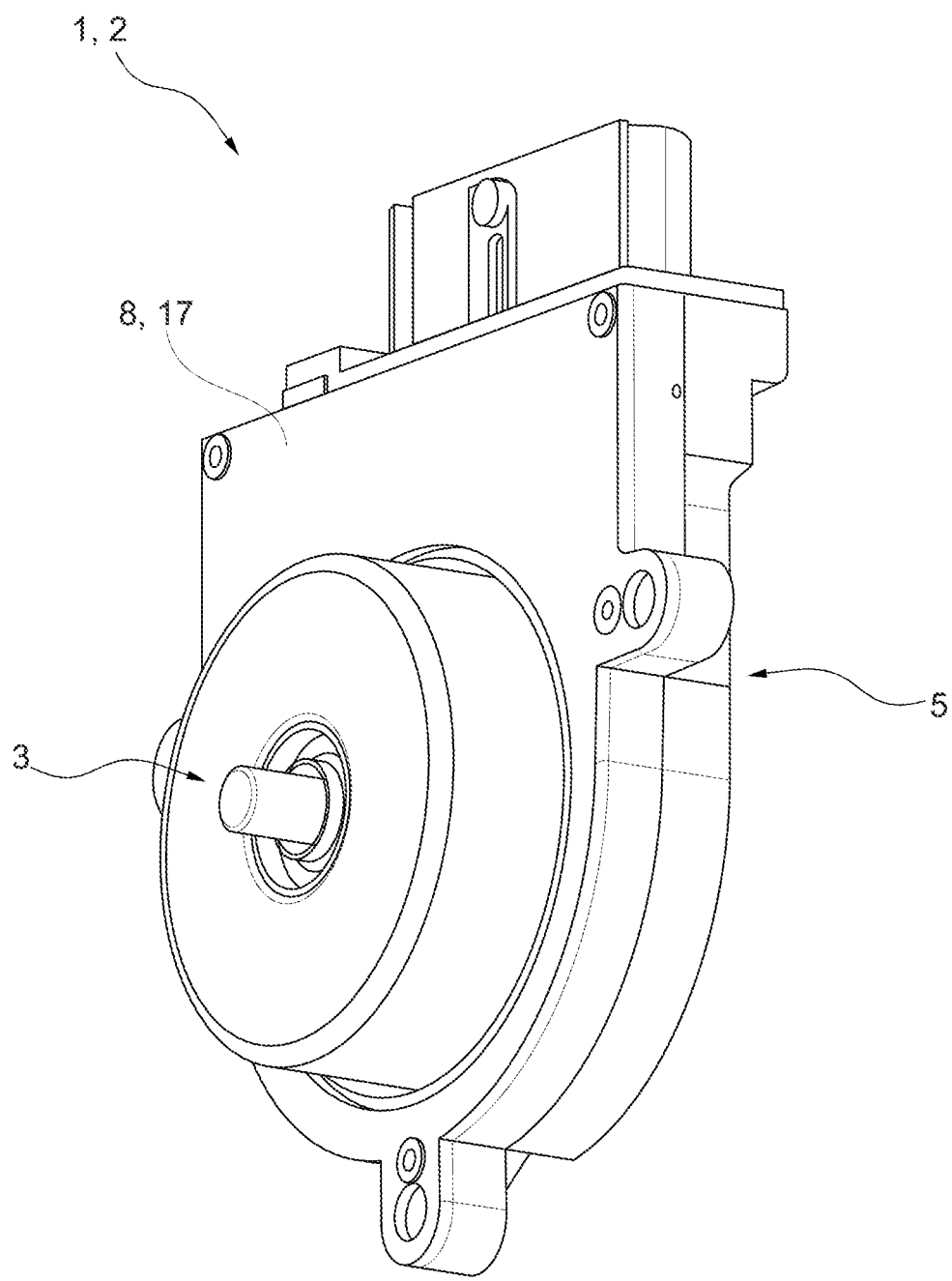
FIG. 2 shows a representation of the electric motor with a base module and an electronic module or plug module.

FIG. 2 illustrates the structure of the electric motor 2 in the joined configuration. A base motor module 3 is shown with a flange plate 8, which can be brought into contact with a motor-fixed component. Due to the flat contact, heat that is developed by the electric motor 2 can be dissipated. The power and control electronics systems for controlling the electric motor 2 are located in the electronic module 4, 5, 6.

Figure 3:
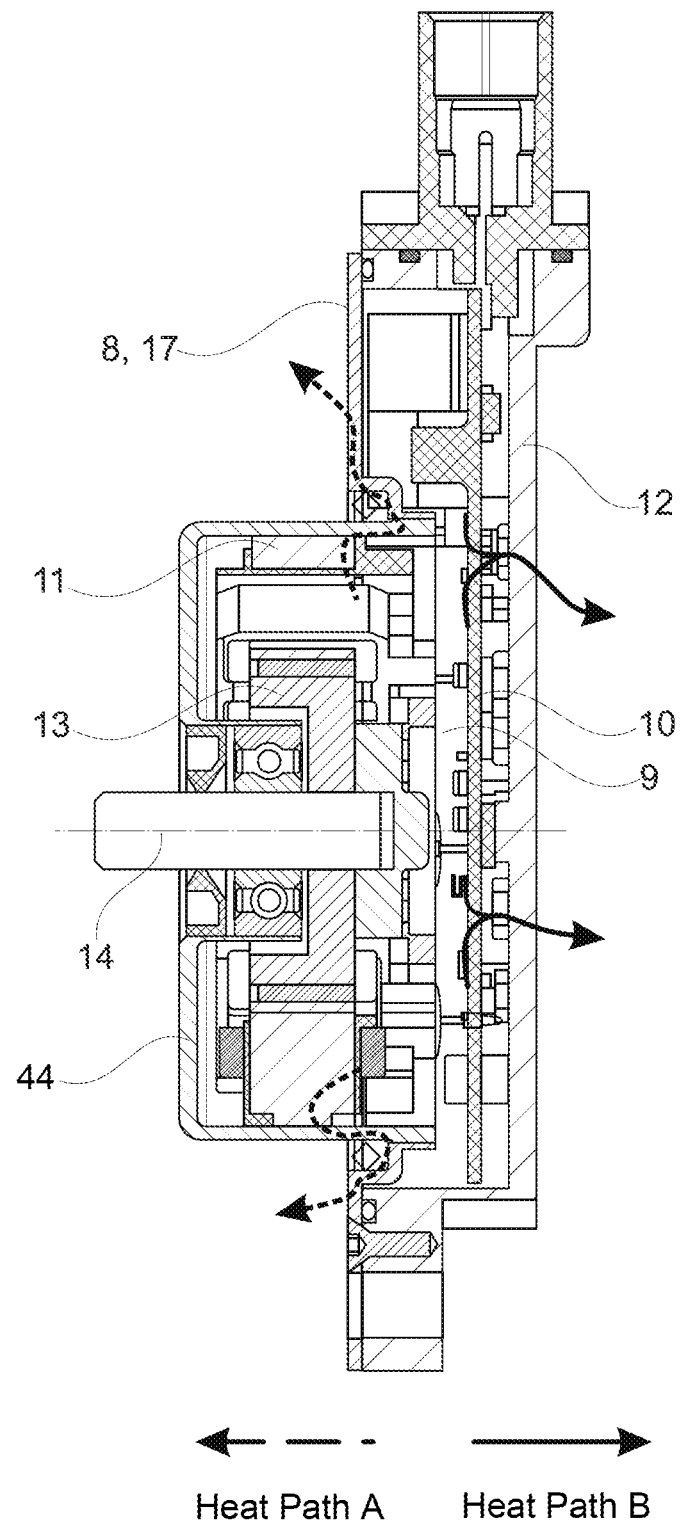
FIG. 3 shows a sectional view of the electric motor with two independent heat paths.

FIG. 3 illustrates the structure in a sectional view. The heat path A is indicated with a dashed line, and the heat path B is indicated with a solid line. It can be clearly seen that the heat paths run separately from one another, separated via an air space 9.

Overall, the base motor module 3 is constructed as an inner rotor, wherein a stator 11, which has windings that can be energized, cooperates with a rotor 13 fastened on a shaft 14, i.e., a motor shaft. The rotor 13 has a pot shape that is open towards the housing base 44. A rotor base denoted by reference numeral 15 thus faces the end face of the base motor module 3 that faces away from the housing base 44. This is the end face of the base motor module 3 that is to be connected to one of the plug modules 4, 5, 6, as will be explained in more detail below. The rotor is equipped with permanent magnets 16. Overall, the base motor module 3 functions as a brushless DC motor. The permanent magnets 16 are embedded in a hollow cylindrical section of the rotor 13 which connects to the rotor base 15 and is slipped over the annular shoulder, i.e., overlaps with the latter in the axial direction.

The waste heat from the power electronics system and the waste heat from the motor windings are dissipated via separate heat paths A, B. The waste heat from the electric motor 2 is largely dissipated into a screw-on body, and the waste heat from the power electronics system is dissipated to the surroundings via an upstream heat sink.

The construction kit 1 with integrated control and driver electronics systems thus has two separate heat dissipation paths A and B in only one structural unit. This makes it possible to operate the electric motor 2 at high temperatures and still integrate the heat-sensitive electronics system of the motor control and motor driver stage.

The simplicity of assembly is achieved by a modularity of the system, in which the base motor is inserted into a flange plate 8 with a variable shape. The electronic module 4, 5, 6 is assembled separately. The "marriage" of the base motor module and the electronic module takes place only in the final assembly step.

This enables the motor control and the motor driver to be combined with an electric motor 2 in one structural unit in the form of the construction kit 1. This solution is designed for high temperatures and mechanical loads that occur on the internal combustion engine of a vehicle by ensuring the cooling. The system can be integrated into the vehicle with little development effort and installation space and can be used to automatically calculate all the required control variables for the electric motor 2.

For the waste heat from the electric motor coils to not generate any additional thermal load for the control and driver electronics systems, the electric motor 2 (heat source A) can be pressed into a flange plate 8 and thermally separated from the control board 10 by an air space 9. The flange plate 8 can be mounted over a large area on the screw-on surface, for example on the internal combustion engine, so that the screw-on surface represents a heat sink for this heat source A. The heat path A accordingly leads from the coils through the stator insulation and the stator laminated core 11, via the motor housing into the flange plate 8 and then into the heat sink, the screw-on surface (see FIG. 3). The motor housing and the flange plate 8 are preferably made of steel in order to ensure a stable press fit even with high temperature fluctuations. In addition, the press fit serves to connect the motor housing to the flange plate 8 over a large area. Flattening the surfaces when joining the press fit increases the actual contact area and thus improves the heat conduction between the two joining partners.

This heat path A can be thermally separated from the power electronics system by an insulating air space 9. The waste heat generated by the power loss of the electronic components on the control board represents heat source B. This is dissipated via a second heat path B into a larger heat capacity, the electronics housing 12, and finally to the environment (see FIG. 3). The electronics housing 12 consists of a very good heat-conducting material, preferably aluminum, and can quickly absorb the waste heat generated suddenly in the electronic components and dissipate it to the surroundings via a generously dimensioned, rough surface. For better introduction of the waste heat into the heat capacity, components with particularly high power losses are connected to the electronics housing 12, preferably using heat-conducting paste. In addition, empty areas of the circuit board are also preferably connected to the electronics housing 12 with heat-conducting paste for better heat dissipation. Furthermore, the large-area application of the heat-conducting paste serves to dampen the vibrations of the internal combustion engine coupled into the electric motor 2.

The control electronics system in particular, for example a microprocessor, is sensitive to heat and must be adequately protected against external heat input and its own waste heat must be dissipated. The separation of the heat dissipation of the two heat sources A and B via the heat paths A and B (see FIG. 3) enables this mechatronic system to operate even at high ambient temperatures. At least one microcontroller for generating the control signals for the motor driver is installed on the control board 10. The microcontroller processes the fed-in target values into the necessary control variables and control signals for the motor driver. The latter energizes the phases of the electric motor 2. There are also circuits for signal filtering and protective circuits on the board, as well as an optional sensor system.

According to the current prior art, welding or soldering techniques are primarily used to establish the electrical connection between the motor phases and the supply lines. The proposed concept uses insulation displacement contacts for contacting the coil wires and press-fit technology for connecting to the control circuit board 10. Both techniques result in a permanently pre-stressed contact, which offers higher vibration resistance and is produced by simple, mechanical joining processes. The contact pins in the plug of the plug module 4, 5, 6 are also contacted to the board by means of press-fit connections in order to achieve high vibration resistance here as well.

Figure 4:
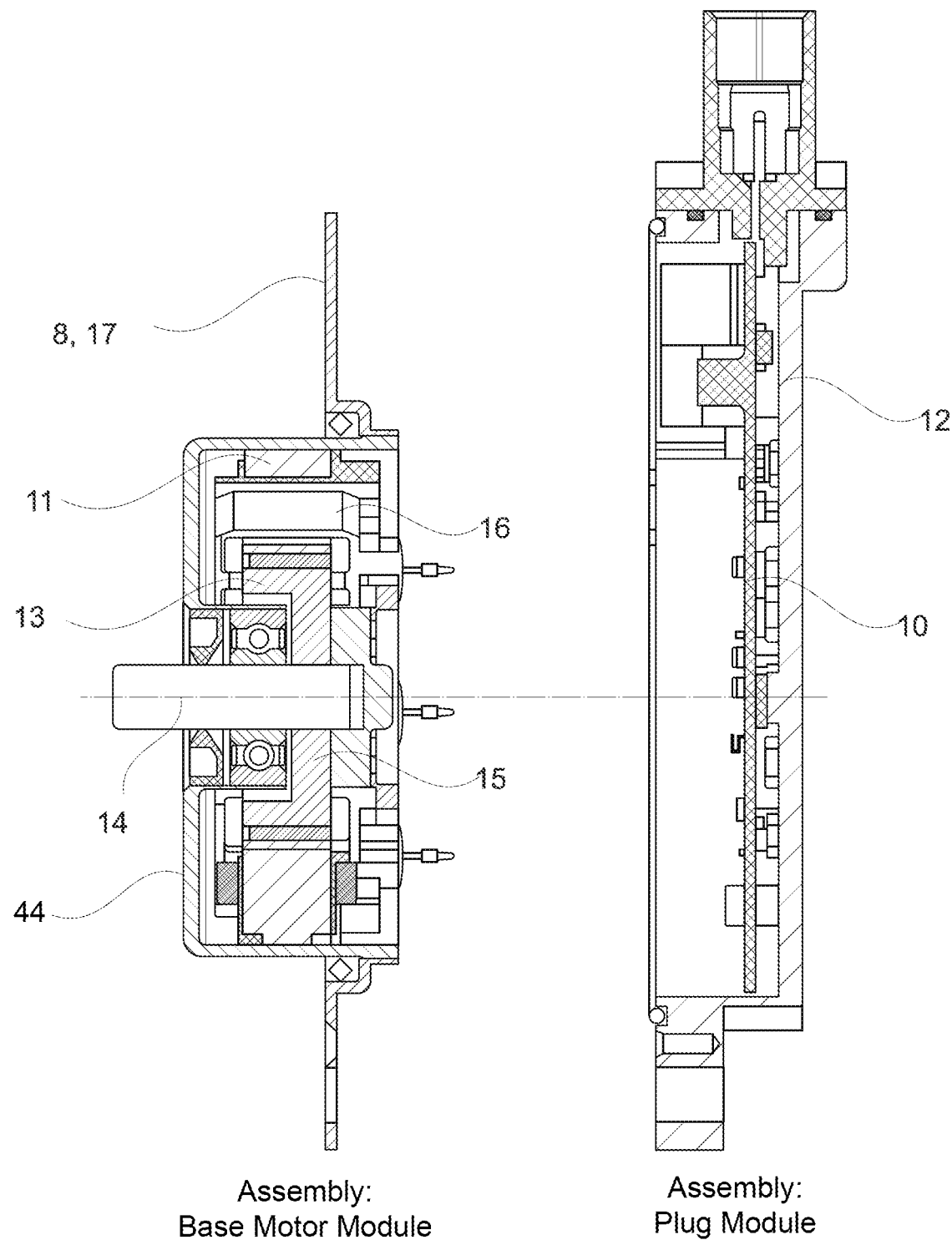
FIG. 4 shows a sectional view of the electric motor with two independent heat paths before the two modules are joined.

FIG. 4 illustrates the modular structure, whereby a common parts strategy can be implemented. The assembly can be divided into two parallel pre-assembly chains. The plug module 4, 5, 6, consisting of the plug connector, electronics housing 12 and control board 10, is constructed separately and thus enables variability with regard to the installation space geometry and the choice of the plug connector type (see FIG. 4). The electric motor with the electric motor stator 11, rotor 13 and output shaft 14 with output element can be pre-assembled in parallel (see FIG. 4). Subsequently, the electric motor 2 is pressed into the flange plate 8, which reflects the screw-on geometry and is finally mounted on the plug module 4, 5, 6 (electronic module) during the so-called "marriage", wherein the electrical contact between the motor phases and the control circuit board 10 is established simultaneously. This structure offers flexibility (of the screw-on geometry, the housing and the plug interface) when using the common parts principle (by using a standardized base motor).

If a second, structurally identical or similar electric motor 2 is to be used, for example in the case of V engines or on intake and exhaust camshafts, the systems can be interconnected in master-slave operation. One system takes over the calculation of the controlled variables and controls itself as the master system and a second electric motor as the slave system.

Furthermore, an operating mode is possible in which two identical electric motors are used, which mutually monitor each other for correct function. In the event of a fault, the intact system can temporarily control the other faulty electric motor while the faulty system restarts. They thus mutually ensure their own operation by means of simple redundancy.

FIG. 5 shows an embodiment of the electric motor 2 with a base motor module 3, which comprises a stator 25 with three phases (divided over multiple coils 26) and a rotor 13, a housing 7, a coupling element, a mutually magnetized magnetic ring and a flange plate 8. The electronic module 18 comprises an electronics housing 12 which is designed in the shape of a trough and which accommodates the printed circuit board 10 and the plug 23.

A plug housing 27 of the plug 23 engages in the electronics housing 12 via an opening 28 on the peripheral side. The plug housing 27 is made of plastic, with supply and signal contacts being overmolded with plastic. Supply and signal contacts have at one end a press-fit contact 29, which is connected to the printed circuit board 10 by means of a mechanical press-in process for contacting. Supply and signal contacts are designed as a stamped grid, which is cut through during the injection molding process (during the plastic injection molding of the plug housing 27).

The plug 23 is inserted into the electronics housing 12 in a form-fitting manner. On the outside there is a flat flange surface which, with a mating surface of the connector housing 27, forms a linear sealing gap. A liquid adhesive is introduced into the sealing gap in order to connect the plug 23 and the electronics housing 12 and in order to seal the electronics housing 12 against environmental influences. The adhesive gap is created as a planar, defined gap between the connector housing 27 and the associated sealing area on the electronics housing 12. Multiple spacer ribs are provided to ensure the required height of the sealing gap. The plug housing 27 has a receptacle for a water- and oil-impermeable, but air-permeable membrane 30.

Coil 26 and printed circuit board 10 must be brought into connection with one another. Press-fit contacts 31 are provided for this connection: When pressed onto the press-fit contacts 31, the press-fit contacts can be supported on supporting surfaces 19. For this purpose, the electronics housing 12 forms two supporting surfaces 19 with which the printed circuit board 10 can be brought into direct contact. The flow of force is directed through the electronics housing 12. In addition, it can be ensured that the printed circuit board 10 can be positioned at a defined distance from the electric motor 2, in particular from the magnetic ring of the rotor 13.

The connection between printed circuit board 10 and electronics housing 12 is produced as follows: A mandrel 20 engages through an opening 21 in the printed circuit board 10, whereby the printed circuit board 10 can be guided and positioned in an end position during assembly. The electronics housing 12 forms a fastening point 32 which is surrounded by one of the supporting surfaces 19. When the press-fit contacts 31 of the coil 26 are pressed in, forces can be conducted into the electronics housing 12 via the supporting surface 19. The fastening point 32 is used to fasten the printed circuit board 10 by means of a screw connection.

The printed circuit board 10 can be supported indirectly on one of the supporting surfaces via the plug 23. The plug 23 is brought into contact with the supporting surface 19. During assembly, the printed circuit board 10 is then pressed against the plug 23, which conducts forces into the electronics housing 12 via the supporting surface 19. When the printed circuit board 10 is pressed in against the electronics housing 12, press-fit contacts 29 are supported in a non-positive manner on a molding 33 of the plug.

A heat-conducting paste 24 is applied between one of the supporting surfaces 19 and the printed circuit board 10. The heat-conducting paste 24 facilitates the dissipation of heat via the electronics housing 12 so that reliable operation is possible even when the electric motor 2 develops a large amount of heat. For this purpose, one of the supporting surfaces 19 is designed as an inwardly offset surface 34 of the pot-shaped electronics housing 12. In this way, a relatively large surface area can be made available, in particular in comparison with the other supporting surface 19. The heat-conducting paste 24 is applied between the electronics housing 12, which is made of aluminum, for example, and the printed circuit board 10.

The electronics housing 12 has a flat, circumferential sealing surface which forms a linear sealing gap with the flange plate 8. As a result, electronics housing 12 and flange plate 8 are connected to one another and the space enclosed by electronics housing 12 and flange plate 8 is sealed against environmental influences.

The flange plate 8 has multiple openings 36 that match the fastening passages 35 of the electronics housing 12. The openings each have a protruding collar 37 which can be introduced into the fastening passage 35 of the electronics housing 12, which is designed as a screw-on eyelet. In this way, the flange plate 8 can be fastened to the electronics housing 12 by means of a press fit. The fastening passage 35 has a shoulder 38, whereby the fastening passage is divided into two sections, one with a large diameter and one with a small diameter. In the area of the section with a large diameter, the collar 37 of the flange plate 8 is pressed in.

Another stepped collar 39 has an inner diameter into which a housing 7 of the base motor module 3 is pressed. An outer diameter forms a receiving gap 40 with the step for a seal 41, which seals the electric motor 2 from the contact surface of the timing drive box (not shown). Heat from the electric motor is dissipated to the environment via the flange plate 8 and the contact surface.

FIG. 6 shows a perspective view of the electric motor from FIG. 5. The housing 7 is connected to the electronics housing 12 via the flange plate 8. The collar 37 engages in a fastening passage 35 of the electronics housing 12. The plug 23 rests with a plug flange 42 on a flat surface of the electronics housing 12 and is fastened to the electronics housing by means of screw connections 43.

LIST OF REFERENCE SYMBOLS

1 Construction kit
2 Electric motor
3 Base motor module
4 Plug module
5 Plug module
6 Plug module
7 Housing
8 Flange plate
9 Air space as insulation space
10 Printed circuit board
11 Stator laminated core
12 Electronics housing
13 Rotor
14 Output shaft
15 Rotor base
16 Permanent magnet
17 Heat-conducting plate
18 Electronic module
19 Supporting surface
20 Mandrel
21 Opening
22 Fastening point
23 Plug
24 Heat-conducting paste
25 Stator
26 Coil
27 Plug housing
28 Opening
29 Press-fit contact
30 Membrane
31 Press-fit contact
32 Fastening point
33 Molding
34 Inwardly offset surface
35 Fastening passage
36 Opening
37 Collar
38 Shoulder
39 Stepped collar
40 Receiving gap
41 Seal
42 Plug flange
43 Screw connection
44 Housing base

The invention claimed is:

1. An electric motor comprising:
a base motor module, and
an electronic module electrically and mechanically connected to the base motor module, the electronic module comprising:
   a printed circuit board, and
   an electronics housing forming:
      two supporting surfaces configured to contact the printed circuit board, and
      a mandrel extending through an opening in the printed circuit board,
   a plug configured:
      as a separate component from the electronics housing,
      to be inserted within an opening arranged on a peripheral side of the electronics housing, and
      to directly contact one of the two supporting surfaces of the electronics housing so that the one of the two supporting surfaces, via the plug, provides support for the printed circuit board when the printed circuit board is pressed into the electronics housing.

2. The electric motor of claim 1, wherein the electronics housing forms a fastening point surrounded by a remaining one of the two supporting surfaces.

3. The electric motor according of claim 1, wherein the electronic module and the base motor module each dissipate heat via one respective heat path, and the two heat paths are separated from one another.

4. The electric motor of claim 1, wherein the base motor module is configured to dissipate heat via a first heat path, and the heat is conducted into a heat sink via a heat-conducting plate.

5. The electric motor of claim 4, wherein the electronic module comprises an electronics housing dissipates heat via a second heat path, and the second heat path runs via the electronics housing to a location outside of the electric motor.

6. The electric motor of claim 1, wherein the base motor module comprises:
   a housing pot,
   a stator, and
   a rotor mounted in the housing pot via a rolling bearing, and
   the base motor module is inserted into the electronic module, and
   electrical connections between the electronic module and the base motor module are produced by joining the modules together in an axial direction.

7. The electric motor of claim 6, wherein the printed circuit board is supported on one of the supporting surfaces via a plug.

8. The electric motor of claim 2, wherein the remaining one of the two supporting surfaces and the fastening point are arranged between the mandrel and the one of the two supporting surfaces.

9. The electric motor of claim 2, wherein the mandrel is separate from the fastening point.

10. The electric motor of claim 2, wherein the fastening point defines a screw connection configured to fasten the printed circuit board to the remaining one of the two support surfaces.

11. An electric motor configured for an internal combustion engine, the electric motor comprising:
a base motor module having:
   a housing pot,
   a stator,
   a rotor mounted in the housing pot via a rolling bearing, and
   a flange plate fixed to the housing pot, the flange plate configured to attach the base motor module to a component outside of the electric motor so as to form a heat conduction path between the base motor module and the component, and
an electronic module fixed to the base motor module via the flange plate, the electronic module comprising:
   an electronics housing having two supporting surfaces and a mandrel,
   a printed circuit board disposed within the electronics housing and supported by the two supporting surfaces, the printed circuit board having an opening configured to receive the mandrel, and
   a plug configured:
      as a separate component from the electronics housing,
      to be inserted within an opening arranged on a peripheral side of the electronics housing, and
      to directly contact one of the two supporting surfaces of the electronics housing so that the one of the two supporting surfaces, via the plug, provides support for the printed circuit board when the printed circuit board is pressed into the electronics housing, and
   the base motor module is inserted into the electronic module and electrical connections between the electronic module and the base motor module are produced by joining the modules together in an axial direction.

12. The electric motor of claim 11, wherein the flange plate is press-fit onto the housing pot.

13. The electric motor of claim 12, wherein the flange plate is press-fit onto the electronic module.

14. The electric motor of claim 13, wherein the flange plate comprises a protruding collar and the electronic module comprises a fastening passage, the protruding collar disposed within and fixed to the fastening passage via a press-fit.

15. The electric motor of claim 12, wherein the electronics housing comprises a mandrel, the mandrel extending through an opening of the printed circuit board so as to guide and position the printed circuit board.

16. The electric motor of claim 12, wherein the electronics housing forms two supporting surfaces configured to contact and support the printed circuit board.

17. The electric motor of claim 12, wherein a first end of the base motor module is disposed in the electronic module and an air space is formed between the first end and the printed circuit board.

18. The electric motor of claim 17, wherein a radial distance of the air space is greater than an outer diameter of the rotor.

19. The electric motor of claim 17, wherein a radial distance of the air space is greater than an outer diameter of the stator.

20. The electric motor of claim 17, wherein the flange plate is plate press-fit onto the electronic module.

* * * * *